(12) United States Patent
Mar et al.

(10) Patent No.: US 6,792,553 B2
(45) Date of Patent: Sep. 14, 2004

(54) CPU POWER SEQUENCE FOR LARGE MULTIPROCESSOR SYSTEMS

(75) Inventors: Clarence Y. Mar, Austin, TX (US); Sompong P. Olarig, Pleasanton, CA (US); John E. Jenne, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 642 days.

(21) Appl. No.: 09/751,506

(22) Filed: Dec. 29, 2000

(65) Prior Publication Data

US 2002/0087906 A1 Jul. 4, 2002

(51) Int. Cl.[7] .............................. G06F 1/26; G06F 1/30
(52) U.S. Cl. ........................... 713/330; 713/1; 327/143
(58) Field of Search ........................... 713/310, 1, 330; 341/43; 327/143

(56) References Cited

U.S. PATENT DOCUMENTS

| | | | | |
|---|---|---|---|---|
| 5,821,826 A | * | 10/1998 | Newlin | ........................ 331/74 |
| 6,158,000 A | * | 12/2000 | Collins | ........................... 713/1 |
| 6,321,340 B1 | * | 11/2001 | Shin et al. | ................... 713/310 |
| 6,333,650 B1 | * | 12/2001 | Amin et al. | ................. 327/143 |
| 6,421,757 B1 | * | 7/2002 | Wang et al. | ................. 711/103 |
| 6,496,881 B1 | * | 12/2002 | Green et al. | ................... 710/58 |

* cited by examiner

Primary Examiner—Thomas Lee
Assistant Examiner—P Chandrasekhar

(57) ABSTRACT

A computer system includes a power supply coupled to a control logic, the power supply including a power_good output signal and Power output lines. The power_good signal notifies the control logic when the Power output lines have stabilized. The computer system also includes a plurality of voltage regulator modules ("VRM") coupled to the control logic, wherein each VRM receives a power good signal from the control logic. A plurality of processors is also present in the computer system, each of the processors coupled to a VRM. Each of the VRMs transmits voltage to a processor to power-on the processor. Each VRM also transmits to its processor and to the control logic a voltage regulator module power good ("VRMP_G") signal. The control logic includes means to control the sequential power-on of the processors so as to reduce the current sourcing requirements of the power supply and eliminate power supply surges.

29 Claims, 3 Drawing Sheets

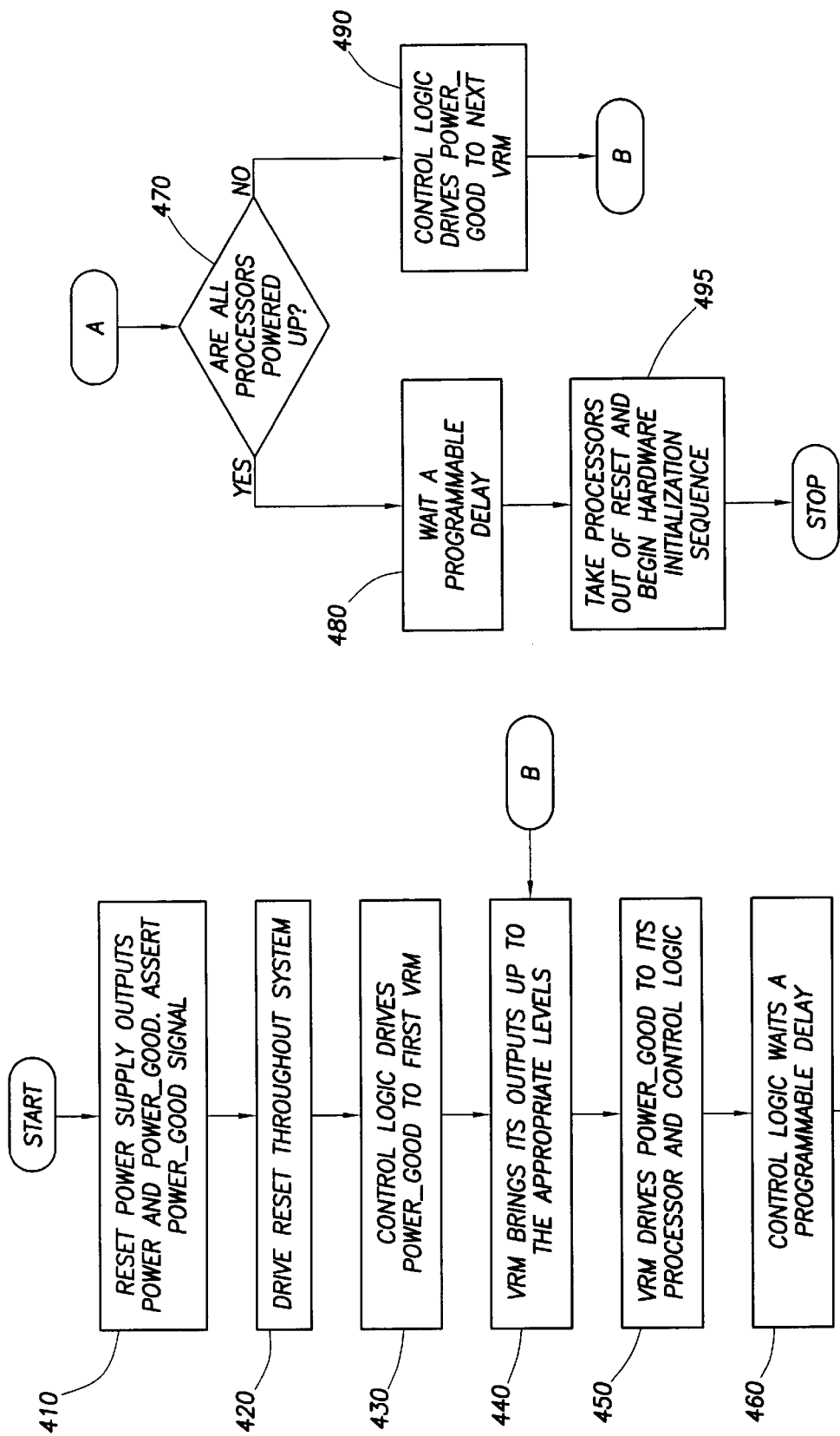

CPU POWER SEQUENCE FOR LARGE MULTIPROCESSOR SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system that contains multiple processors and a main power supply. More particularly, the invention relates to an apparatus and method to sequentially power-on the processors of the computer system and thereby reduce the current source requirements of the power supply and power supply surges.

2. Background of the Invention

Modern day computer systems use multiple power voltages to power the processor in the computer system. In a computer system requiring 2.7 volts, 3.3 volts, 5 volts, 12 volts or any other appropriate voltage, during power-on the computer system's power management circuits apply power to the processor in the proper sequence required by the processor. Similarly, in current multiprocessor systems (i.e., computer systems with more than one processor) power management circuits turn on the 2.7 volt, 3.3 volt, 5 volt, 12 volt, and any other appropriate voltage supplies in the proper sequence required for each processor. In multiprocessing computer systems, all processors of the computer system are powered on together.

Higher processor clock speeds typically require more power. Thus, as processor clock speeds increase, so does the power requirement. Moreover, currently available multiprocessing computer systems are expanding into 8, 16, 32 processors and beyond. The number of processors and processor power demands are increasing such that current surges during power-on are becoming an important issue.

FIG. 1 shows a plot of power supply current versus time for power-on of a multiprocessing computer system containing four processors in which all processors are powered on simultaneously. As can be seen from FIG. 1, multiprocessing computer system designs can have a significant current surge Peak_A during power-on at time T that requires a power source much greater than the standard Norm amperage shown in FIG. 1. In one preferred embodiment, the Norm amperage may be in the range between 13 to 17 amperes and preferably 15 amperes.

It would be advantageous if a simple method and apparatus could be used to sequentially power-on the processors of a multiprocessing computer system to reduce the peak instantaneous current surge occurring at power-on. It would also be advantageous for such an apparatus to automatically (i.e., without user interaction) power-on the processors in a not noticeable time period to reduce the peak instantaneous current surge and thus minimize the requirements of the power supply. Despite the apparent advantages of such a system, to date no such system has been implemented.

BRIEF SUMMARY OF THE INVENTION

The problems noted above are solved in large part by a system and method that sequentially powers on the processors of a multiprocessing computer system to reduce the current sourcing requirements of the power supply and eliminate power supply surges. According to the exemplary embodiment of the invention, the computer system includes a power supply coupled to a control logic, the power supply including a power_good output signal and Power output lines. The power_good signal notifies the control logic when the power supply Power output lines have stabilized. The computer system also includes a number of voltage regulator modules ("VRM") coupled to the control logic, with each VRM receiving a power good signal from the control logic. Each VRM transmits voltage to a processor to power-on the processor. Each VRM also transmits to its processor and to the control logic a voltage regulator module power good ("VRMP_G") signal. The VRMP_G signal indicates that the VRM voltage output lines have stabilized. The control logic of the computer system may be a state machine implemented in a programmable array logic ("PAL") or other programmable logic device ("PLD"). The control logic controls the sequential power-on of the processors in the multiprocessing computer system.

In accordance with the exemplary embodiment, sequential power-on of the processors in the multiprocessing computer system comprises the following steps. First, the power supply asserts its power_good signal to the control logic after the power supply output lines have stabilized. Next, the control logic places all processors of the computer system into a reset state. The control logic asserts a control logic power_good signal to a first VRM. Next, after waiting a first programmable delay for the VRM to stabilize its voltage output lines to appropriate levels, the VRM asserts a VRM power_good signal to the VRM's processor and the control logic after the VRM voltage output lines have stabilized. The control logic after waiting a second programmable delay for the processor to reach a stable electrical state determines whether all processors are powered on. If all processors are not powered on, the control logic drives another control logic power_good signal to the next VRM and repeats the steps given above. After all processors have been powered on and after waiting a third programmable delay, the control logic takes all processors of the multiprocessing computer system out of reset to begin hardware initialization and Power-On-Self-Test ("POST").

BRIEF DESCRIPTION OF THE DRAWINGS

For a detailed description of the exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical connection. Thus, if a first device couples to a second device, that connection may be through a direct electrical connection, or through an indirect electrical connection via other devices and connections.

The term "CPU", "processor", and "microprocessor" are used interchangeably throughout the specification to refer to a logic device that interprets and executes software instructions.

DETAILED DESCRIPTION OF THE EXEMPLARY EMBODIMENTS

Figure 1:
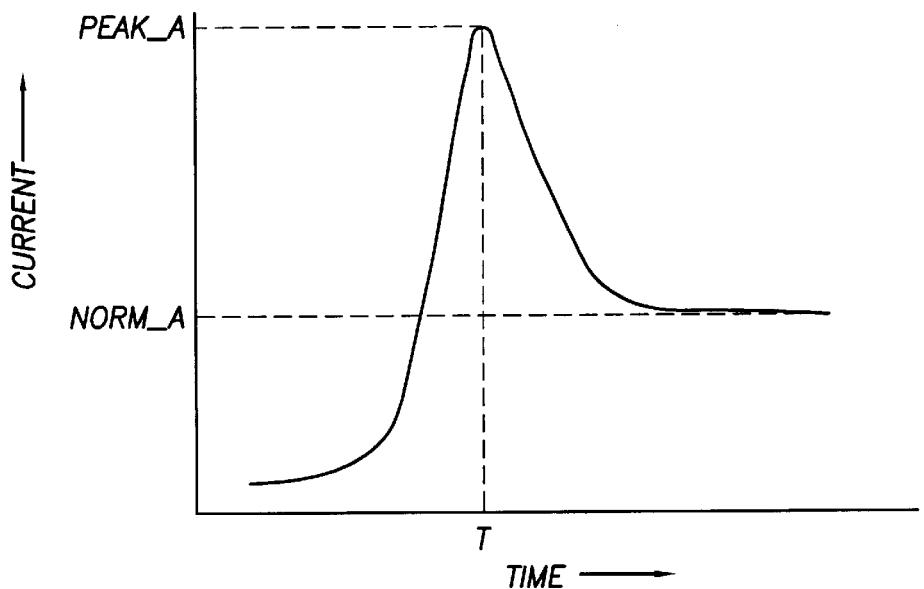
FIG. 1 shows a graph of power supply current versus time for a multiprocessing computer system in which all processors are powered on simultaneously.
Figure 2:
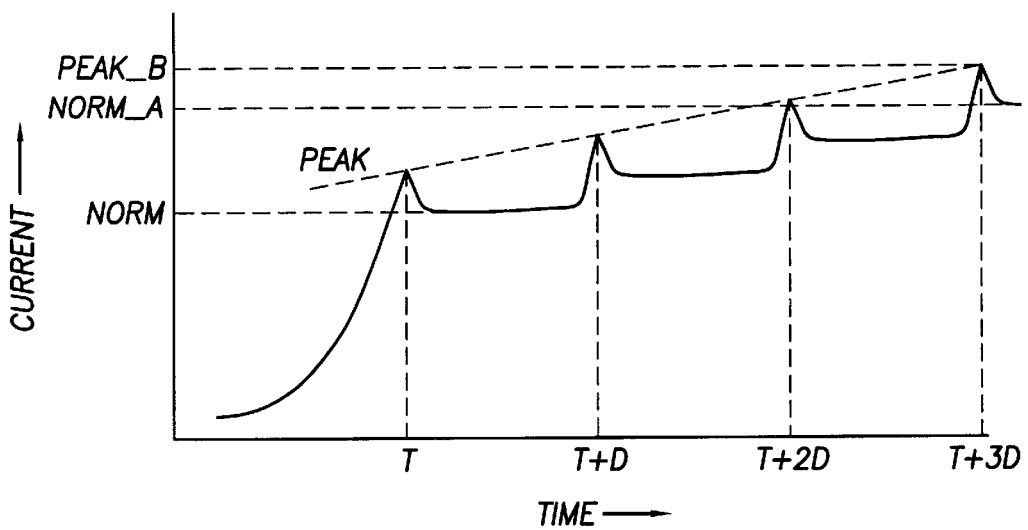
FIG. 2 shows a graph of power supply current versus time for a multiprocessing computer system in which processors are powered on in sequence.

In accordance with the exemplary embodiment of the invention, FIG. 2 shows a plot of power supply current versus time for power-on of a multiprocessing computer system incorporating sequencing the power-on for each processor to power-on the processor's one after the other so as to reduce the current surge. In FIG. 2, the Peak current surge at time T during power-on of a first processor in the multiprocessing computer system is much smaller then the surge shown in FIG. 1. After power-on of the first processor, the first processor settles to a steady state current Norm that differs in much smaller magnitude from Peak when compared to the difference between Peak_A and Norm_A of FIG. 1. As each processor in the multiprocessing computer system is powered on after a settling time D, the current surges to a Peak value before settling to a steady state value. For a multiprocessing computer system containing four processors as shown in FIG. 2, at time T+3D when the final processor is powered up, the current surge reaches a maximum value Peak_B before settling to a steady state current Norm_A. Because the Peak_A current of FIG. 1 consists of summing over an instantaneous time period T each of the smaller Peak current values shown in FIG. 2 at time T, T+D, T+2D, and T+3D, Peak_B shown in FIG. 2 is much less than Peak_A shown in FIG. 1. The value of Peak_B for the last processor to be powered on is sufficiently low to minimize the current sourcing requirements of the power supply. The final steady state current Norm_A supplied by the power supply to the multiprocessing computer system of FIG. 2 is the same as the final steady state current Norm_A supplied to the multiprocessing computer system of FIG. 1.

Figure 3:
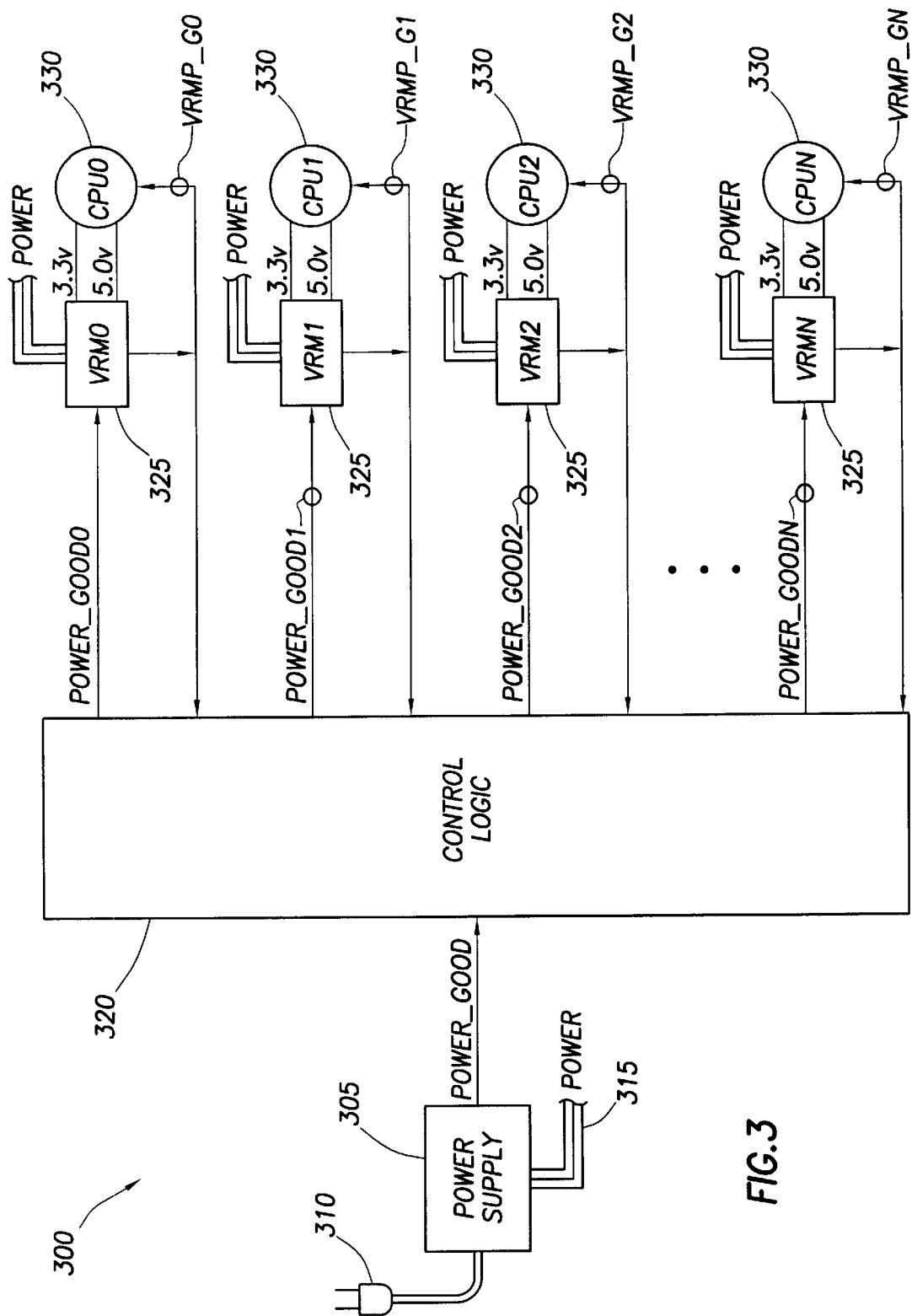
FIG. 3 shows a diagram of a multiprocessing computer system in accordance with the exemplary embodiment of the present invention; and FIG. 4a and FIG. 4b shows a flow chart for powering on processors in sequence in accordance with the exemplary embodiment of the present invention.

Referring now to FIG. 3, in accordance with the exemplary embodiment of the invention, a multiprocessing computer system 300 constructed in accordance with the exemplary embodiment comprises a power supply 305 coupled to control logic 320, Voltage Regulator Modules ("VRMs") 325, and Central Processing Units ("CPUs") 330. As shown in FIG. 3, multiprocessing computer system 300 preferably includes multiple processors 330 each coupled to a VRM 325. All VRMs 325 couple to a power supply 305 through control logic 320.

According to the exemplary embodiment, the power supply 305 may be any standard main power supply with a power_good output signal. Power socket 310 connects to a wall outlet that supplies standard alternating current to the power supply 305. Power supply 305 converts the alternating current into direct current and transmits the power over power output line 315. Power output line 315 transmits power to each of the VRMs 325. In the exemplary embodiment, the power supply produces 2.7 volts, 3.3 volts, 5 volts, $V_{ccp}$ volts or any other appropriate voltage.

The power_good output signal from the power supply 305 connects to control logic 320, which may comprise a programmable array logic ("PAL") or other programmable logic device ("PLD"). The power_good signal connects to an input of the control logic 320. Preferably, as shown in FIG. 3 the output terminals of the control logic 320 couple to the power good input terminals power_good0, power_good1, power_good2 and power_goodn of the VRMs. Acknowledgment signal VRMP_G ("Voltage Regulator Module Power Good") from each VRM is applied as an input signal to the control logic 320. The VRMP_G signal informs the control logic that the VRM has brought its output lines up to the appropriate voltage levels. In a second exemplary embodiment, the VRMP_G signal from each VRM may be replaced by a programmed delay that waits a set time period after the power_good signal has been transmitted to each VRM. The delay permits the VRM to bring its voltage output lines up to appropriate voltage levels and to power-on the processor. The control logic 320 may include a hardware implementation of the method of sequencing the processors 330 described below for the exemplary embodiment of the invention. Alternatively, in another exemplary embodiment, the control logic may be used with operating system level software or Basic Input Output Subsystem ("BIOS") firmware stored in ROM that implements the method of sequencing the processors 330 and executes on a controller included in the control logic 320.

In accordance with the exemplary embodiment, each VRM 325 receives a power_good input signal from the control logic, as well as power input 315. Each VRM regulates the voltages and applies the voltages in proper sequence to power-on the processor 330. In the exemplary embodiment, the VRM may output 2.7 volts, 3.3 volts or 5.0 volts based on the needs of the processor, but is not limited to outputting only these voltages. Each VRM also generates a VRMP_G signal (thus VRM0 generates VRMP_G0, VRM1 generates VRMP_G1, VRM2 generates VRmp_G2, and VRMn generates VRMP_Gn) that notifies the control logic 320 and processor 330 that the VRM has brought its output lines up to the appropriate voltage levels.

The CPU processor 330 of the exemplary embodiment includes power input lines that transmit a plurality of different voltages depending on the requirements of the processor 330. In the exemplary embodiment as shown in FIG. 3, a processor 330 may require 3.3 volts or 5.0 volts to power-on properly. A different set of processors may require 2.7 volts and 3.3 volts in an alternative exemplary embodiment. Each processor 330 also includes an input for the VRMP_G signal. The VRMP_G signal informs the processor 330 that the VRM 325 voltage output lines have stabilized and the processor 330 can begin initialization and power-on.

In another exemplary embodiment of the invention, the power supply 305 and control logic 320 are manufactured as a single unit, making the power supply into an "intelligent" power supply. Rather than a single power_good output line, multiple power good output lines (i.e., power_good0, power_good1, power_good2, and power_goodn) are present, one for each VRM 325/processor 330. The intelligent power supply controls the power-on sequencing for all processors of the multiprocessing computer system by implementing the method of the exemplary embodiment described in greater detail below. Preferably, the intelligent power supply contains inputs for VRMP_G signals from each VRM. The VRMP_G signal informs the intelligent power supply that the VRM has brought its output lines up to the appropriate voltage levels. In another exemplary embodiment of the invention, the VRMP_G signal from each VRM may be replaced by a programmed delay that waits a set time period after the power good signal has been transmitted to each VRM. The delay permits the VRM to bring its output lines up to appropriate voltage levels and to power-on the processor.

In one exemplary embodiment of the method of powering on the processors of a multiprocessing computer system using the apparatus of FIG. 3, after the user applies the power-on switch and the power supply output lines have stabilized to appropriate voltage levels, the power supply 305 asserts the power_good signal to control logic 320. The control logic 320 places all processors into a reset state. Next, control logic 320 drives a power_good signal to the first VRM 325. After the VRM 325 has brought its output lines up to the appropriate levels, it drives VRMP_G to its processor 330 and the control logic 320. The control logic 320 then waits some programmable delay for the processor associated with the first VRM 325 to power-on and reach a stable electrical state (i.e., power supply current to stabilize to Norm shown in FIG. 2) before driving power_good to the next VRM 325. This power-on sequence continues until all the processors 330 have been powered on one at time. Once all processors 330 have been powered on, the multiprocessing computer system 300 is taken out of reset and initialization of hardware and Power-On-Self-Test is started.

Turning now to FIGS. 4a and 4b, in step 410, power supply output lines Power 315 and power_good are initially reset and after Power 315 has stabilized, the power supply asserts the power_good signal to the control logic. Next, in step 420, all devices of the multiprocessing computer system 300 are reset (i.e., their voltage inputs are grounded) by the control logic. The control logic in step 430 drives power_good to the first VRM. In step 440, the VRM stabilizes its output lines to the appropriate levels required by the processor. After stabilizing its output lines, in step 450 the VRM drives VRMP_G to its processor and the control logic in the exemplary embodiment of the invention. The VRM sequences its voltage output lines in the appropriate order required by its processor. Thus, in a processor requiring application of 3.3 volts and 12 volts in sequence, the 3.3 volts are applied before the 12 volts. After receiving the VRMP_G signal from the VRM, in step 460, the control logic waits a programmable delay to permit the processor to reach a stable electrical state. In step 470, the control logic determines if all processors have been powered up by determining if all VRMP_G inputs have been asserted. If all processors have not been powered up, the control logic drives power_good to the next VRM in step 490 and repeats the sequence of steps 440 to 470 shown in FIGS. 4a and 4b. If all processors have been powered up in the multiprocessing computer system, the control logic waits a programmable delay, step 480, to allow remaining circuitry in the multiprocessing computer system to settle to a steady electrical state and then takes all processors in the multiprocessing computer system out of reset in step 495. Hardware initialization and POST is started after the computer system is taken out of reset.

The above apparatus and system is not limited to only multiprocessing computer systems with multiple processors but may be used to reduce power surges in any conventional chained system in which similar devices are powered on simultaneously. For example another situation in which the method of the exemplary embodiment can be implemented is the synchronization and powering up of multiple servers to alleviate power surges and simplify powering up or down many servers. In one exemplary embodiment, the servers may be organized in racks in a cabinet. One such server system is the Compaq Proliant DL360 Application Specific Provider ("ASP"). In each cabinet including racks of servers, a control module functionally equivalent to the control logic 320 synchronizes powering up the servers in the rack. The power supply for a cabinet provides power to each server in the cabinet. Even if the power switch for a particular server is on, the server does not power-on until a power good signal from the control module to each server is asserted. Thus, the control module can turn each server on one at a time or in groups at a time. The control module like the control logic 320 does not supply power, it simply tells each of the servers in a cabinet when to turn on.

In the exemplary embodiment for powering up multiple servers, the control module in each cabinet can be coupled to other control modules in other cabinets. After one cabinet including racks of servers is powered on, the control module can assert a completion signal to the next control module in another cabinet. The next control module after receiving the completion signal from the previous cabinet indicating that the previous cabinet of servers had completed powering on, would begin powering its racks of servers. The above steps would continue until all cabinets including racks of servers had powered on.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a power supply coupled to a control logic, said power supply including a first control signal and Power output lines, wherein said first control signal notifies the control logic when the Power output lines have stabilized;
   a plurality of voltage regulator modules ("VRM") coupled to said control logic, wherein each VRM receives a second control signal from the control logic indicating that the Power lines have stabilized; and
   a plurality of processors, each of said processors coupled to an individual VRM, wherein said VRMs sequentially transmit voltage to power-on the plurality of processors so that at least two of the plurality of processors do not start to power-on simultaneously.

2. The computer system of claim 1 wherein each of said VRMs transmits to its processor and to the control logic a third control signal, said third control signal indicating that the VRM voltage output lines have stabilized.

3. The computer system of claim 1 wherein said power supply asserts the first control signal after the power supply output lines have stabilized and said control logic places all processors of the computer system into a reset state and drives a second control signal to a first VRM.

4. The computer system of claim 3 wherein said control logic waits a first programmable delay for the VRM to stabilize its voltage output lines to appropriate levels and said VRM drives a third control signal to the VRM's processor and the control logic after the VRM voltage output lines have stabilized.

5. The computer system of claim 4 wherein said control logic waits a second programmable delay for the processor to reach a stable electrical state, determines whether all processors are powered on, and if all processors are not powered on drives another second control signal to the next VRM and repeats the steps of claim 4 or if all processors are powered on takes all processors out of reset and begins hardware initialization after waiting a third programmable delay.

6. The computer system of claim 1 wherein said power supply asserts the first control signal after the power supply output lines have stabilized and said control logic places all processors of the computer system into a reset state and drives a second control signal to a first VRM.

7. The computer system of claim 6 wherein said control logic waits a first programmable delay for the VRM to stabilize its voltage output lines to appropriate levels and for the processor to power-on and reach a stable electrical state.

8. The computer system of claim 7 wherein said control logic determines whether all processors are powered on, and if all processors are not powered on drives another second control signal to the next VRM and repeats the steps of claim 7 or if all processors are powered on takes all processors out of reset and begins hardware initialization after waiting a second programmable delay.

9. A method of powering on processors in a computer system that reduces the current source requirements of the computer system's power supply, comprising:
   a) asserting a first control signal from the power supply after output lines of the power supply have stabilized;
   b) placing all processors of the computer system into a reset state; and
   c) driving a second control signal to a first voltage regulator module ("VRM").
   d) waiting a first programmable delay for the VRM to stabilize its voltage output lines to appropriate levels; and
   e) driving a third control signal to the processor coupled to the VRM and to the control logic after the VRM voltage output lines have stabilized;
   f) waiting a second programmable delay for the processor coupled to the VRM to reach a stable electrical state;
   g) determining whether all processors in the computer system are powered on;
   h) driving another second control signal to the next VRM and repeating d) through g) if all processors in the computer system are not powered on; and
   i) taking all processors out of reset and beginning hardware initialization if all processors are powered on after waiting a third programmable delay.

10. A computer system, comprising:
   an intelligent power supply including a control logic, said power supply including a plurality of first control signals and Power output lines;
   a plurality of voltage regulator modules ("VRM") coupled to said intelligent power supply, wherein each VRM receives a first control signal from the intelligent power supply, after the control logic receives an indication from the power supply that the power output lines have become stable; and
   a plurality of processors, each of said processors coupled to an individual VRM, wherein said VRMs sequentially transmits voltage to power-on the plurality of processors so that at least two of the plurality of processors do not start to power-on simultaneously.

11. The computer system of claim 10 wherein each of said VRMs transmits to its processor and to the Intelligent power supply a second control signal, said second control signal indicating that the VRM voltage output lines have stabilized.

12. The computer system of claim 10 wherein said intelligent power supply places all processors of the computer system into a reset state and drives a first control signal to a first VRM.

13. The computer system of claim 12 wherein said intelligent power supply waits a first programmable delay for the VRM to stabilize its voltage output lines to appropriate levels and said VRM drives a third control signal to the VRM's processor and the control logic after the VRM voltage output lines have stabilized.

14. The computer system of claim 13 wherein said control logic waits a second programmable delay for the processor to reach a stable electrical state, determines whether all processors are powered on, and if all processors are not powered on drives another first control signal to the next VRM and repeats the steps of claim 15 or if all processors are powered on takes all processors out of reset and begins hardware initialization after waiting a third programmable delay.

15. The computer system of claim 10 wherein said intelligent power supply places all processors of the computer system into a reset state and drives a first control signal to a first VRM.

16. The computer system of claim 15 wherein said intelligent power supply waits a first programmable delay for the VRM to stabilize its voltage output lines to appropriate levels and for the processor to power-on and reach a stable electrical state.

17. The computer system of claim 14 wherein said Intelligent power supply determines whether all processors are powered on, and if all processors are not powered on drives another first control signal to the next VRM and repeats the steps of claim 18 or if all processors are powered on takes all processors out of reset and begins hardware initialization after waiting a second programmable delay.

18. A computer system, comprising:
   a power supply coupled to a control module, said power supply including a first control signal and Power output lines, wherein said first control signal notifies the control module when the Power output lines have stabilized;
   a plurality of voltage regulator modules ("VRM") coupled to said control module, wherein each VRM receives a second control signal from the control module indicating that the Power lines have stabilized; and
   a plurality of computer servers organized in racks in a cabinet, each of said computer servers coupled to an individual VRM, wherein said VRMs sequentially transmit voltage to power-on the plurality computer servers so that at least two of the plurality of computer servers do not start to power-on simultaneously.

19. The computer system of claim 18 wherein each of said VRMs transmits to its computer server and to the control module a third control signal, said third control signal indicating that the VRM voltage output lines have stabilized.

20. The computer system of claim 18 wherein said power supply asserts the first control signal after the power supply output lines have stabilized and said control module places all computer servers of the computer system into a reset state and drives a second control signal to a first VRM.

21. The computer system of claim 20 wherein said control module waits a first programmable delay for the VRM to stabilize its voltage output lines to appropriate levels and said VRM drives a third control signal to the VRM's computer server and the control module after the VRM voltage output lines have stabilized.

22. The computer system of claim 21 wherein said control module waits a second programmable delay for the computer server to reach a stable electrical state, determines whether all computer servers are powered on, and if all computer servers are not powered on drives another second control signal to the next VRM and repeats the steps of claim 23 or if all computer servers are powered on takes all computer servers out of reset and begins hardware initialization after waiting a third programmable delay.

23. The computer system of claim 18 wherein said power supply asserts the first control signal after the power supply output lines have stabilized and said control module places all computer servers of the computer system into a reset state and drives a second control signal to a first VRM.

24. The computer system of claim 23 wherein said control module waits a first programmable delay for the VRM to stabilize its voltage output lines to appropriate levels and for the computer server to power-on and reach a stable electrical state.

25. The computer system of claim 24 wherein said control module determines whether all computer servers are powered on, and if all computer servers are not powered on drives another second control signal to the next VRM and repeats the steps of claim 26 or if all computer sewers are powered on takes all computer servers out of reset and begins hardware initialization after waiting a second programmable delay.

26. The computer system of claim 25 wherein if all the computer servers in a cabinet are powered on, the control module asserts a completion signal to another control module in another cabinet including another power supply in which computer servers that are not powered on, and repeats the steps of claim 22 through claim 25 until all cabinets of the computer system are powered on.

27. A system, comprising:
   a power supply, wherein the power supply includes a first control signal and a set of power output lines;
   control logic coupled to the power supply, wherein the control logic receives the first control signal and includes a set of second control signals;
   a plurality of voltage regulator modules (VRMs) coupled to the control logic, wherein each VRM receives at least one of the set of second control signals and at least one of the power output lines;
   a plurality of processors coupled to the plurality of VRMs, wherein each processor is coupled to an individual VRM by a third control signal;
   wherein the control logic is configured to wait a first programmable delay before asserting each of the set of second control signals, and the individual VRM asserts the third control signal after a second programmable delay.

28. The system of claim 27 wherein the second programmable delay is approximately equal to the time required for a power output line of the individual VRM to stabilize.

29. The system of claim 27 wherein the control logic is further configured to assert each of the set of second control signals until all processors of the system are powered on.

* * * * *